US009695485B2

(12) United States Patent
Wulfert et al.

(10) Patent No.: US 9,695,485 B2
(45) Date of Patent: Jul. 4, 2017

(54) METHOD FOR THE TREATMENT OF STEELWORK SLAG AND HYDRAULIC MINERAL BINDER

(75) Inventors: Holger Wulfert, Berlin (DE); Horst-Michael Ludwig, Kronach (DE)

(73) Assignee: LOESCHE GmbH, Duesseldorf (DE)

( * ) Notice: Subject to any disclaimer, the term of this patent is extended or adjusted under 35 U.S.C. 154(b) by 46 days.

(21) Appl. No.: 14/419,167

(22) PCT Filed: Sep. 6, 2012

(86) PCT No.: PCT/EP2012/003744
§ 371 (c)(1),
(2), (4) Date: Feb. 2, 2015

(87) PCT Pub. No.: WO2014/037020
PCT Pub. Date: Mar. 13, 2014

(65) Prior Publication Data
US 2015/0159233 A1    Jun. 11, 2015

(51) Int. Cl.
*C21C 5/36* (2006.01)
*C04B 5/06* (2006.01)
(Continued)

(52) U.S. Cl.
CPC .............. *C21C 5/36* (2013.01); *C04B 5/06* (2013.01); *C04B 7/147* (2013.01); *C21B 3/08* (2013.01);
(Continued)

(58) Field of Classification Search
CPC .... C22B 7/04; C21C 5/36; C21B 3/08; C04B 7/147; C04B 5/06
See application file for complete search history.

(56) References Cited

U.S. PATENT DOCUMENTS 4,124,404 A * 11/1978 Suzuki .................... C04B 7/147
  106/765
5,944,870 A * 8/1999 Edlinger .................. C04B 5/06
  75/434
(Continued)

FOREIGN PATENT DOCUMENTS

CN    1115580    1/1996
CN    1148409    4/1997
(Continued)

OTHER PUBLICATIONS

JP 2636612 B2 published Jul. 1997. machine translation.*
(Continued)

*Primary Examiner* — George Wyszomierski
*Assistant Examiner* — Tima M McGuthry Banks
(74) *Attorney, Agent, or Firm* — Dinsmore & Shohl LLP

(57) ABSTRACT

The invention relates to a method for processing steel slag to produce a hydraulic mineral binder with a high hardening potential and to recover iron. There is provision for this purpose to provide a feed product comprising steel slag with MnO. This feed product is further processed as a melt by introducing reducing agent into the melt. A lime saturation factor of between 90 and 110 is hereby to be achieved in the mineral melt portion. Subsequently the melt is cooled in a defined manner and elementary iron is mechanically separated from the solidified melt. The solidified melt is then supplied for use as hydraulic mineral binder. Furthermore the invention relates to a hydraulic mineral binder.

13 Claims, 2 Drawing Sheets

Figure 1:
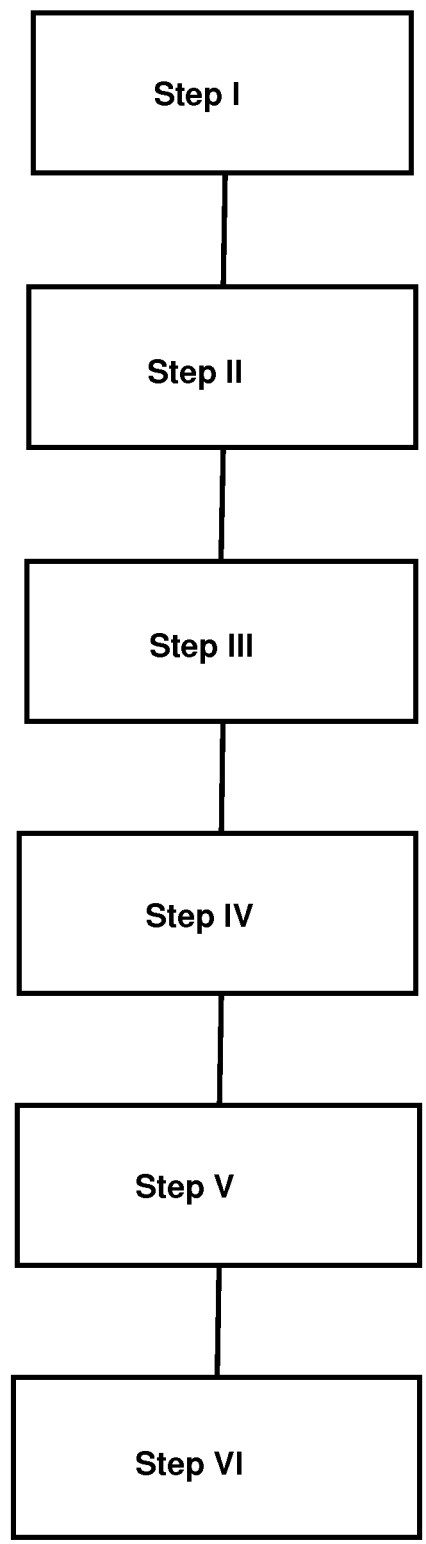

(51) Int. Cl.
*C04B 7/147* (2006.01)
*C22B 7/04* (2006.01)
*C21B 3/08* (2006.01)

(52) U.S. Cl.
CPC ............... *C22B 7/04* (2013.01); *Y02P 10/216* (2015.11); *Y02P 40/143* (2015.11)

(56) References Cited

U.S. PATENT DOCUMENTS

| | | | | |
|---|---|---|---|---|
| 2010/0170421 | A1* | 7/2010 | Nguyen | ............... C04B 5/06 106/789 |
| 2012/0073404 | A1* | 3/2012 | Ki | ............... C22B 7/005 75/10.67 |
| 2012/0325055 | A1 | 12/2012 | Gerold et al. | |
| 2016/0107930 | A1* | 4/2016 | Wulfert | ............... C22B 7/04 75/434 |

FOREIGN PATENT DOCUMENTS

| | | | |
|---|---|---|---|
| DE | 2728289 | | 12/1977 |
| DE | 2829370 | A1 | 1/1979 |
| EP | 1370501 | | 12/2003 |
| EP | 1697271 | | 12/2003 |
| GB | 1556833 | A * | 11/1979 |
| JP | S60211049 | A | 10/1985 |
| JP | 2636612 | B2 * | 7/1997 ............... C04B 5/00 |
| JP | H09-511795 | A | 11/1997 |
| JP | 2011074441 | A | 4/2011 |
| TW | 201130563 | | 9/2011 |
| WO | 95/07365 | A1 | 3/1995 |
| WO | WO9624696 | | 8/1996 |
| WO | WO2011107124 | | 9/2011 |

OTHER PUBLICATIONS

Ziemkiewcz, P. "Steel Slag: Applications for AMD Control." Proceedings of the 1998 Conference on Hazardous Waste Research (1998): 44-62. Web. Feb. 21, 2017.*
English translation of International Search Report mailed May 23, 2013 related to PCT/EP2012/003744 filed Sep. 6, 2012.
International Search Report mailed May 23, 2013 related to PCT/EP2012/003744 filed Sep. 6, 2012.
J. Stark & B. Wicht: "Zement und Kalk: der Baustoff als Werkstoff", Jan. 1, 2000, Birkhauser Verlag, Basel Boston Berlin, XP002697525, ISBN: 3-7643-6216-2.
Tsakiridis P. E., et al. "Utilization of steel slag for Portland cement clinker production", Journal of Hazardous Materials, Elsevier, Amsterdam, NL, vol. 152, No. 2, Apr. 1, 2008, pp. 805-811, XP026052157, ISSN: 0304-3894, DOI: 10.1016/J.JHAZMAT.2007.07.093 [retrieved on Apr. 1, 2008].
Handbook of Cements, Gypsums, and Limes; The Society of Inorganic Materials Japan; Nov. 1, 1995, p. 185 (no English Translation Available).
Kubodera, Manufacture of Cement by Converter Slag Refinement, Iron and Steel, the Iron and Steel Institute of Japan, URL=http://ci.nii.ac.jp/lognavi?name=nels&lang=eng&type=pdf&id=ART001787655, 1978, 64.4, 179 (no English Translation Available).
Official Action issued in corresponding JP Application No. 2015-530301 dated Aug. 10, 2016.
Cembureau, "Best Available Techniques" for the Cement Industry, 1999, 1-236, Cembureau, Brussels.

* cited by examiner

METHOD FOR THE TREATMENT OF STEELWORK SLAG AND HYDRAULIC MINERAL BINDER

The invention relates to a method for processing steel slag to produce a hydraulic mineral binder with a high hardening potential and to recover iron according to claim 1.

Steel slag, which is also called LD slag, LDS, LD converter slag, BOS or SWS, may—according to the process—still contain very large quantities of iron. This iron is present partly in metallic form but mainly in the form of oxides minerally bonded in the slag. These iron oxides present in the slag cannot be recovered in a purely mechanical way, as they are fixedly incorporated in the slag matrix and must initially be transformed into the elementary metallic form through a thermo-chemical reduction. The slag matrix consists mainly of the typical oxides calcium oxide, silicon dioxide and aluminium oxide. In contrast with other slag forms, such as for example blast furnace slag, however, they do not arise in hydraulically active phases and are not therefore suited for high-quality utilisation in cement. They are therefore used almost exclusively as grit in highway construction.

EP 1 370 501 B1 discloses for example a method for treating steel slag in order to provide the slag with the properties of a hydraulic binder. The resulting product is described as at least equivalent to Portland cement clinker. In this case, the steel slag—which contains, relative to the slag total weight, at least 45 wt. % of calcium oxide and less than 30 wt. % of $Fe_2O_3$—undergoes oxidising treatment with oxygen or air at a pressure ranging between 1 and 15 bars, at a temperature ranging between 1650° C. to 1400° C. A lime source is added to this slag and supplemented if required with a silicon dioxide source or an aluminium oxide source. The proportions of the lime source and optionally the silicon dioxide or aluminium oxide source are selected so that the slag, after transformation and at room temperature, has a $Fe_2O_3$ content of at least 13 wt. % and a mineralogical composition comprising at least 40 wt. % of the mineralogical phase $C_3S$ and more than 10 wt. % of calcium chloride/fluoride in the form of the mineralogical phases $C_2F$ or C4AF.

A disadvantage of this method is that the iron present in the slag is not recovered.

Another method for processing steel slag is described in EP 1 697 271 B1. In this case, a hydraulic binder is to be produced having at least 25 wt. % of calcium and magnesium aluminosilicates, at least 5 wt. % of mineral oxides and/or halides as well as maximum 31 wt. % of aluminium oxide, maximum 10 wt. % of calcium aluminoferrite and maximum 0.01 wt. % of carbon. In order to obtain this product, base materials—including also steel slag—are to be melted in corresponding quantities in a reducing atmosphere. The resulting product is to be isolated. This can be carried out by means of rapid cooling, for example with water or air, and also by means of slow cooling.

Irrespectively of the type of cooling, it seems that no noteworthy quantities of the main clinker phase alite are formed. It is not described whether and how any elementary iron hereby formed is separated.

It is thus the object of the invention to indicate a method for processing steel slag, wherein both a hydraulic mineral binder with a high hardening potential can be produced and also iron can be recovered. It is further an object of the invention to provide a hydraulic mineral binder with a high hardening potential.

This object is achieved according to the invention through a method for processing steel slag having the features of claim 1.

Advantageous embodiments of the invention are indicated in the sub-claims and in the description.

In the method according to the invention there is firstly provision for a feed product comprising steel slag with iron compounds, in particular in oxide form, and MnO, whereby the MnO may be contained in the steel slag. This feed product is further processed as melt by incorporating reducing agent into the melt to reduce the iron compounds in order to achieve a lime saturation factor of between 90 and 110 in the mineral melt portion, wherein the reducing agent is introduced in a non-oxidising atmosphere. Subsequently the melt is cooled in a defined way with the melt solidifying in 15 minutes at the earliest. Elementary iron is then mechanically separated from the solidified melt. The solidified melt, which has a reduced iron content, is then supplied for use as a hydraulic mineral binder.

According to the meaning of the invention, feed product is intended to mean the steel slag and, if necessary, further correcting components such as MnO. Sufficient MnO may hereby already be present in the slag, meaning that no correcting components need to be added. This is the case at least with some steel slags examined. In most cases the iron compounds are present in the steel slag as iron halides, iron sulphides, iron selenides and in particular iron oxides such as FeO, $Fe_2O_3$ or $Fe_3O_4$.

The feed product can be heated in suitable receptacles to the melt or it can also be provided externally in the melt—liquid state. An electric arc furnace, in particular in a three-phase closed form, may be used for example to melt the feed product or to further heat the melt.

By introducing the reducing agent, the iron compounds are transformed into the elementary metallic form. In the mineral melt part, a lime saturation factor in a range of between 90 and 110, preferably between 95 and 105, is achieved. Mineral melt part can be understood as the melt less the elementary iron. The lime saturation factor (LSF, Kalkstandard or KSt) indicates the CaO content actually present in the raw material or clinker as a percentage of the respective CaO content which can be bonded under large-scale combustion and cooling conditions in the maximum case to $SiO_2$, $Al_2O_3$ and $Fe_2O_3$.

It is defined by the following equation:

$$KSt \frac{100 \, CaO}{2,80 \cdot SiO_2 + 1,1 \cdot Al_2O_3 + 0,7 \cdot Fe_2O_3}$$

(where KSt=lime saturation factor).

By carrying out the reduction in a non-oxidising atmosphere, this prevents back-oxidation of the iron which has already been reduced and thus increases the yield of elementary iron. This further contributes to achieving the lime saturation factor.

After the melt has solidified the elementary iron can be mechanically separated and supplied for a further utilisation. A large proportion of the iron settles in the lower region of the melt vessel due to the greater density relative to the remainder of the slag. A further portion remains in the form of droplets and inclusions in the cooled slag.

The slag with the reduced iron content can be used as hydraulic mineral binder. This binder is described below as LDS binder.

The method according to the invention allows, in a simple and efficient manner, a high proportion of elementary iron to be recovered from steel slag and furthermore an extremely reactive hydraulic mineral binder to be obtained which is predominantly suited as composite material for high-quality binder. This LDS binder is characterised by very high reactivity and hardening capacity. It has an alite content ($C_3S$) of at least 40 wt. %.

The invention is based essentially upon three interacting basic ideas: firstly, the provision of MnO in the melt; secondly, the reduction of the iron until the indicated lime saturation factor is reached in the mineral melt part; and, thirdly, the slow defined cooling.

The defined cooling process causes the formation of very large alite crystals. These can be up to a millimeter in size. Furthermore no back-formation processes to belite ($C_2S$) and free or unslaked lime (CaO) can be seen at the edges of the crystals during investigations. Slow cooling processes lead, under conventional clinker production conditions, to breakdown of the alite into belite and free lime. Against this background, a high-resource clinker cooling is necessary within the cement production.

The particularly high reactivity of the alite phase obtained in spite of the large crystals is due to the presence of $Mn^{2+}$ ions, which are incorporated into the lattice structure of the alite phase and disturb this, with the result that the hardening potential of the LDS binder—due in particular to the alite phase—is considerably increased.

In the inventive processing of the melt under reducing conditions the Mn is present in its bivalent form as $Mn^{2+}$. Introduction into the lattice of the alite is thus possible, whereby Ca is replaced in the lattice. Incorporation rates of up to 3% are hereby achieved.

This is not possible in conventional cement clinker production. Insofar as Mn compounds are present in the cement raw materials, the Mn will be present through the oxidative process in the cement clinker production as $Mn^{3+}$. In this way the $Mn^{3+}$ tends to be incorporated onto the lattice sites of the Fe in the $C_4AF$. An incorporation of $Mn^{3+}$ onto the Ca lattice sites of the alite or the belite is not possible.

Consequently, a comparable reactivity increase of the alite is not possible in conventional cement clinker production in an oxidising atmosphere, as the manganese, if present, is present as $Mn^{3+}$. The same also applies to all methods for treating steel slag which are carried out under oxidising conditions.

The high stability of the alite can be due on the one hand to the fact that the formation of the alite in the LDS binder, in contrast with the conventional sintering process, in the cement clinker production, takes place slowly from the melt phase according to the invention. On the other hand the stability is due to the incorporation of $Mn^{2+}$.

Finally, the required lime saturation factor also plays a decisive role in the high alite proportion and the high reactivity of the LDS binder according to the invention.

In principle, any amount of MnO may be present in the feed product. It is advantageous, however, if the feed product has 0.1 wt. % to 10 wt. %, in particular 0.5 wt. % to 5 wt. %, of MnO. At this content level of manganese oxide it is guaranteed that a significant quantity of $Mn^{2+}$ ions will be incorporated into the crystal lattice of the alite phase and thereby disturb the crystal structure.

It is advantageous if the feed product contains up to 5 wt. % of $Al_2O_3$ and/or 30 to 50 wt. % of CaO and/or 10 to 20 wt. % of $SiO_2$. It is even more advantageous if the feed product contains 3 to 5 wt. % of $Al_2O_3$ and/or 35 to 45 wt. % of CaO and/or 15 to 20 wt. % of $SiO_2$.

With these phase compositions the formation of the alite phase is enhanced having regard to thermo-chemical viewpoints. Furthermore, in these concentration ranges of the oxides in question, it is highly probable that a lime saturation factor of between 90 and 110, or even more preferably, between 95 and 105, will be achieved. Should the aforementioned composition not already be contained in the steel slag material supplied, the oxides lacking can optionally be added before or during the melt process.

The melt advantageously has a temperature of approximately 1600° C. to approximately 1800° C., in particular from 1650° C. to 1750° C., before and/or during the reduction. All components of the feed product, in particular the oxide portions, are completely melted in this temperature range and the reduction reaction takes place sufficiently quickly so that a rapid progression of the reduction process is guaranteed from energy and thermo-chemical viewpoints.

The non-oxidising atmosphere can be a reducing atmosphere. The reduction process, which takes place mainly through the added reducing agent in solid form, is thereby further supported.

It is preferable for carbon, silicon and/or other metals or semi-metals to be used as reducing agents. In particular petroleum coke is suited for carbon modification as it has a very high specific surface and correspondingly high reactivity. Silicon, calcium and aluminium have the further advantage that the oxides can form parts of the slag.

At least a part of the reducing agent can be blown into the melt, for example by means of an inert gas flow. Hollow electrodes are suited in particular for blowing the reducing agent into the melt when using an electric arc furnace. Besides a particularly efficient distribution of the reducing agent in the melt, a further contribution to mixing is achieved by the blowing-in. The use of an inert gas ensures that undesirable secondary reactions, in particular oxidation of the reducing agent and the oxide components contained in the melt, are avoided. Argon, for example, is particularly suited for use as an inert gas. A different proportion of the reducing agent can optionally be previously mixed with the feed slag in a certain ratio.

When using carbon as a reducing agent, carbon monoxide and carbon dioxide can be produced as by-products of the reduction of the oxides. These gases escape from the melt and this can lead to foaming of the melt. In order to reduce foaming, it may be advantageous to incorporate borax into the melt.

According to a preferred embodiment of the method according to the invention, liquid elementary iron is separated after the reducing process and before the solidifying process of the melt. As liquid elementary iron has a higher density than the melt phase, it collects at the bottom of the melt furnace and can be removed from there relatively simply. Melt furnace or melting unit can be understood within the scope of the invention to mean a receptacle for receiving the melt phase, which allows the melt to be kept in the liquid state through additional energy input, for example an electric arc furnace.

In principle the melt can be cooled slowly as desired. It is preferable, however, if the melt has solidified at the latest after four hours, in particular two hours. Within this time period, thermodynamically stable mineralogical phases, in particular of alite, can form.

The defined cooling can be carried out in cooling receptacles. In particular, ingot or permanent moulds or other receptacles are suitable for this purpose, with which the cooling process can be influenced in terms of time. The cooling receptacles can be supplied by special casting machines, which are in turn filled from the melting unit.

According to a preferred embodiment of the method according to the invention the mechanical separation of the elementary iron takes place by means of a grinding process and a classifying process. For this method step, a method is suited in particular, as disclosed in the international patent application WO 2011/107124 A1. The iron is released during the grinding process and then separated on a grinding plate through the density differences between the iron and the mineralogical matrix. It is subsequently discharged over the plate edge and further enriched optionally through subsequent sorting and classification processes. In order to reduce and de-agglomerate the solidified melt, a roller mill, preferably of the LOESCHE type, is used.

In addition the invention relates to a hydraulic mineral binder which has a mineralogical composition of at least 40 wt. % of alite ($C_3S$) and a lime saturation factor of approximately 90 to 110. A higher alite content of 50 wt. %, in particular 60 wt. %, is preferable. The hydraulic mineral binder can be produced by means of the method according to the invention and is also described within the scope of the invention as LDS binder.

The LDS binder has a mineralogical composition of maximum 30 wt. % of glass phases. These do not make any contribution to the binding ability of the binder but can bind free lime, i.e. calcium oxide, and thereby increase the lime saturation factor.

Figure 2:
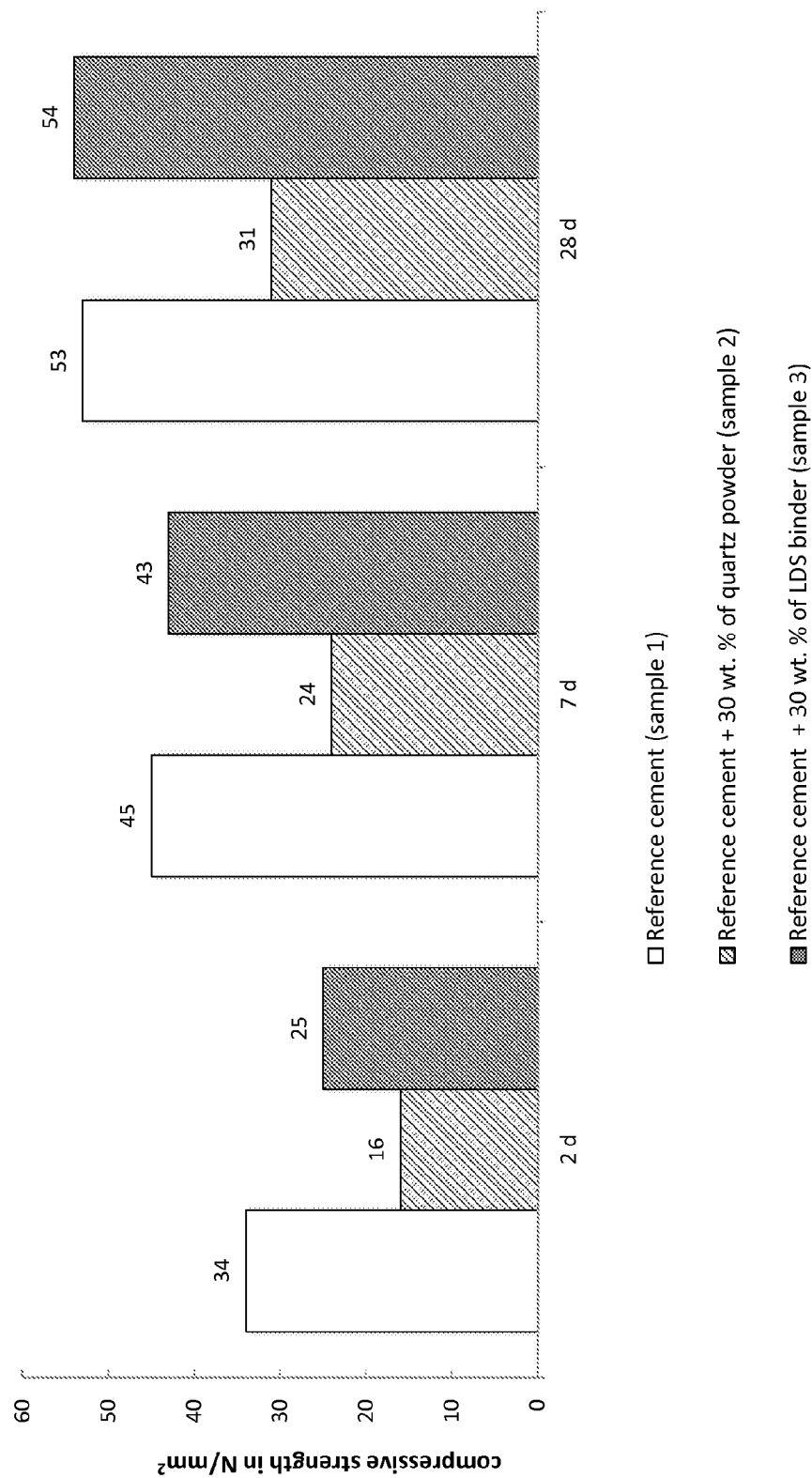

The invention will be explained in greater detail below with the aid of a schematic exemplary embodiment by reference to the figures, in which:

FIG. 1 shows a schematic flowchart of an embodiment of the method according to the invention; and FIG. 2 shows a bar chart revealing investigations into the strength of the hydraulic mineral binder according to the invention.

A feed product is provided in step I in the flowchart according to FIG. 1. This feed product comprises essentially LD slag. The feed product has a MnO content in the range of between 1 wt. % and 5 wt. %. Many LD slags, which are also described as SWS, already have a MnO content in the desired range. If this is not the case, the Mno is added to the slag. Reducing agent can already be added to the feed product in this step. Petroleum coke is particularly suitable for this purpose.

In the subsequent step II, the processing of the feed product to the melt takes place, if required. The slag can either be obtained already in the melt liquid state from an upstream process or also be present in the cold solid form. Melting and/or heating of the slag can take place in an electric arc furnace. It can be operated in resistance operation with a fire-resistant composition of graphite or carbon-containing fire-resistant material. The electric arc furnace can also be described as a melt unit.

The melt should reach a temperature of between approximately 1650° C. and 1750° C. before the addition of reducing agent is stated in step III.

By reducing the iron compounds in the melt, carbon monoxide and/or carbon dioxide can be produced which escape from the melt as gases. This can lead to foaming of the melt. In order to reduce foaming, a small quantity of borax can be added to the melt. The viscosity of the melt is hereby reduced.

In order to suppress the re-oxidation of the reduced iron, the furnace atmosphere is enriched with an inert gas, for example with argon. The argon can also be directly introduced into the melt. A part of the reducing agent can then also be blown with the argon flow directly into the melt. The argon flowing through the melt causes swirling of the melt bath and this has a positive effect on the metal separation.

As soon as essentially all the iron compounds present in the feed product have been reduced, the remaining mineral melt part should have a lime saturation factor of between 90 and 110. This is to be noted with the composition of the feed product. The desired lime saturation factor can be achieved with many LD slags.

In step IV, the liquid melt is conveyed, for example via a pouring apparatus, into special cooling units such as ingot moulds and slowly cooled there in a time period of at least fifteen minutes to approximately two hours. A part of the iron—approximately 80%—is deposited both in the melt unit and in the cooling units as a separate phase at the bottom. It can be separated here still in the liquid state. Another portion of the metal phase remains, however, after cooling, in the form of drops and inclusions in the mineral part. In this case, mechanical processing thereof is necessary to increase the metal yield.

This mechanical separation of elementary iron takes place in stage V through a grinding process by means of a LOESCHE roller mill and subsequent classifying. In this case the iron can be separated due to the difference in density from the mineralogical part. The method described in WO 2011/107124 A1 is particularly suited for this purpose.

The remaining mineral part is the LDS binder according to the invention, which is present in stage VI. It can be utilised as a high-quality hydraulic mineral binder.

Table 1 lists the chemical composition of a feed product which is an untreated LD slag and the LDS binder obtained by means of the method according to the invention. The values are given here in wt. % in each case.

| | Base slag (untreated) | LDS binder |
|---|---|---|
| $SiO_2$ | 13.9 | 19.6 |
| $Al_2O_3$ | 1.7 | 2.7 |
| Fe2O3 | 28.8 | 2.7 |
| CaO | 42.7 | 62.3 |
| MgO | 3.3 | 3.4 |
| $TiO_2$ | 0.47 | 0.72 |
| MnO | 5.2 | 3.89 |
| $K_2O$ | 0 | 0.04 |
| $Na_2O$ | 0.02 | 0.29 |
| $SO_3$ | 0.1 | 0.1 |
| $S^{2-}$ | 0.1 | 0.31 |
| $P_2O_5$ | 1.07 | 1.12 |

Table 1: Chemical analysis of the base slag and the LDS binder in wt. %

According to Table 1 there is a lime saturation factor of 70.1 for the base slag and of 104.3 for the LDS binder. Table 2 reproduces the crystalline composition of the base slag and the LDS binder in wt. %.

| | Base slag (untreated) | LDS binder |
|---|---|---|
| Alite, $C_3S$ | 5.1 | 66.1 |
| Belite, $C_2S$ | 22.2 | 9.8 |
| $C_{12}A_7$ | 0.6 | |
| $C_3A$ | 2.2 | 5.3 |
| $C_4AF$ | 23.2 | 1.2 |
| XRD amorphous | 38.6 | 11.8 |

Table 2: Phase composition of the base slag and the LDS binder according to Rietveld in wt. %.

As can be deduced from Table 2, it is possible with the method according to the invention to obtain a high alite portion of up to 66 wt. % in the LDS binder. It is also to be emphasised that in the method according to the invention the formation of other less reactive phases such as for example belite ($C_2S$) is reduced. The belite phase does indeed also make a contribution to the strength of the LDS binder but to a lower extent and at later times than the alite phase. The higher the alite portion in a hydraulic mineral binder is, the higher is its hardening capacity and the more universal is its suitability as a construction material.

The good reactivity of the LDS binder has been demonstrated by investigating strength in accordance with DIN EN 196 on standard mortar prisms after 2, 7 and 28 days. The results of the strength studies are shown in FIG. 2.

Three different samples were formulated for this purpose and the results thereof were compared with each other. Reference cement CEM I 42.5 R was used as the first sample. The second sample had a composition of 70% reference cement and 30% quartz sand, fraction 0-2 mm, wherein the quartz sand was used as non-reactive inert aggregate. The third sample comprised 70% reference cement and 30% LDS binder. The LDS binder was hereby ground to a specific surface of 4000 $cm^2/g$ Blaine.

It follows from the results of this investigation shown in FIG. 2 that the sample 3 with the LDS binder lies above the strength level of the comparative sample 2 with quartz sand. It can be concluded from this that already after 2 days the LDS binder provides an independent contribution to the strength. After 7 days, the sample 3 with LDS binder almost reached the strength level of the reference cement and after 28 days even exceeded it.

In summary it can be ascertained that it is possible through the method according to the invention to recover iron from steel slag and to produce a hydraulic mineral binder having a surprisingly good hardening capacity.

The invention claimed is:

1. A method for processing steel slag to produce a hydraulic mineral binder with high hardening potential and to recover iron, comprising the steps:
    providing a feed product comprising steel slag with iron compounds and MnO, wherein the MnO may be contained in the steel slag,
    processing the feed product as melt,
    incorporating reducing agent into the melt to reduce the iron compounds in order to achieve a lime saturation factor in a mineral part of the melt between 90 and 110, wherein the incorporation of the reducing agent is carried out in a non-oxidizing atmosphere,
    slow cooling, wherein the melt solidifies in 15 minutes at the earliest,
    mechanical separation of elementary iron from the solidified melt, and
    subsequent supply of the solidified melt with a reduced iron content for use as hydraulic mineral binder.

2. The method according to claim 1,
characterized in that
the feed product has 0.1 to 10 wt. % of MnO.

3. The method according to claim 1,
characterized in that the feed product contains one or more of the compounds in the group consisting of: up to 5 wt. % of $Al_2O_3$, 30-50 wt. % of CaO, and 10 to 20 wt. % of $SiO_2$.

4. The method according to claim 1,
characterized in that
the melt has a temperature of approximately 1600° C. to approximately 1800° C. before and/or during the reduction.

5. The method according to claim 1,
characterized in that
the non-oxidizing atmosphere is a reducing atmosphere.

6. The method according to claim 1,
characterized in that at least one of
carbon, silicon, or other metals or semi-metals are used as reducing agents.

7. The method according to claim 1,
characterized in that
at least part of the reducing agent is blown into the melt.

8. The method according to claim 7,
characterized in that
the reducing agent blown into the melt is blown in by means of an inert gas flow.

9. The method according to claim 1,
characterized in that
borax is incorporated into the melt.

10. The method according claim 1,
characterized in that
liquid elementary iron is separated after the reduction and before solidification of the melt.

11. The method according to claim 1,
characterized in that
the melt has solidified after 4 hours at the latest.

12. The method according to claim 1,
characterized in that
the defined cooling takes place in cooling receptacles.

13. The method according to claim 1,
characterized in that
the mechanical separation of the elementary iron takes place by means of a grinding process and a classifying process.

* * * * *